United States Patent [19]

Baker

[11] 3,887,931
[45] June 3, 1975

[54] PARALLAX FREE VIEWER

[75] Inventor: James G. Baker, Winchester, Mass.

[73] Assignee: Polaroid Corporation, Cambridge, Mass.

[22] Filed: Oct. 16, 1973

[21] Appl. No.: 406,893

[52] U.S. Cl. .............................. 354/155; 354/225
[51] Int. Cl. .......................................... G03b 13/08
[58] Field of Search .......... 354/152, 155, 219, 224, 354/225; 350/9, 27

[56] References Cited
UNITED STATES PATENTS
3,783,760   1/1974   Allen et al. ...................... 354/225 X

*Primary Examiner*—Samuel S. Matthews
*Assistant Examiner*—E. M. O'Connor
*Attorney, Agent, or Firm*—Frederick H. Brustman; Michael Bard; John W. Ericson

[57] ABSTRACT

A novel viewing arrangement for a reflex camera includes a concave mirror that forms an image of a focusing screen through a window in a plane mirror that folds the reflex camera's optical path. The concave mirror is conaxial with the center of an echelon mirror formed on the surface of, and concentric with, the focusing screen. It forms an aerial image of the focusing screen and the real image formed thereon by the camera's objective lens. An eye lens magnifies the aerial image for a user who views the scene through it from an eye station. One embodiment utilizes an ellipsoidal reflecting surface on the concave mirror. Another embodiment utilizes a parabolic reflecting surface on the concave mirror and a plane mirror to erect the image and direct it toward the eye lens.

17 Claims, 3 Drawing Figures

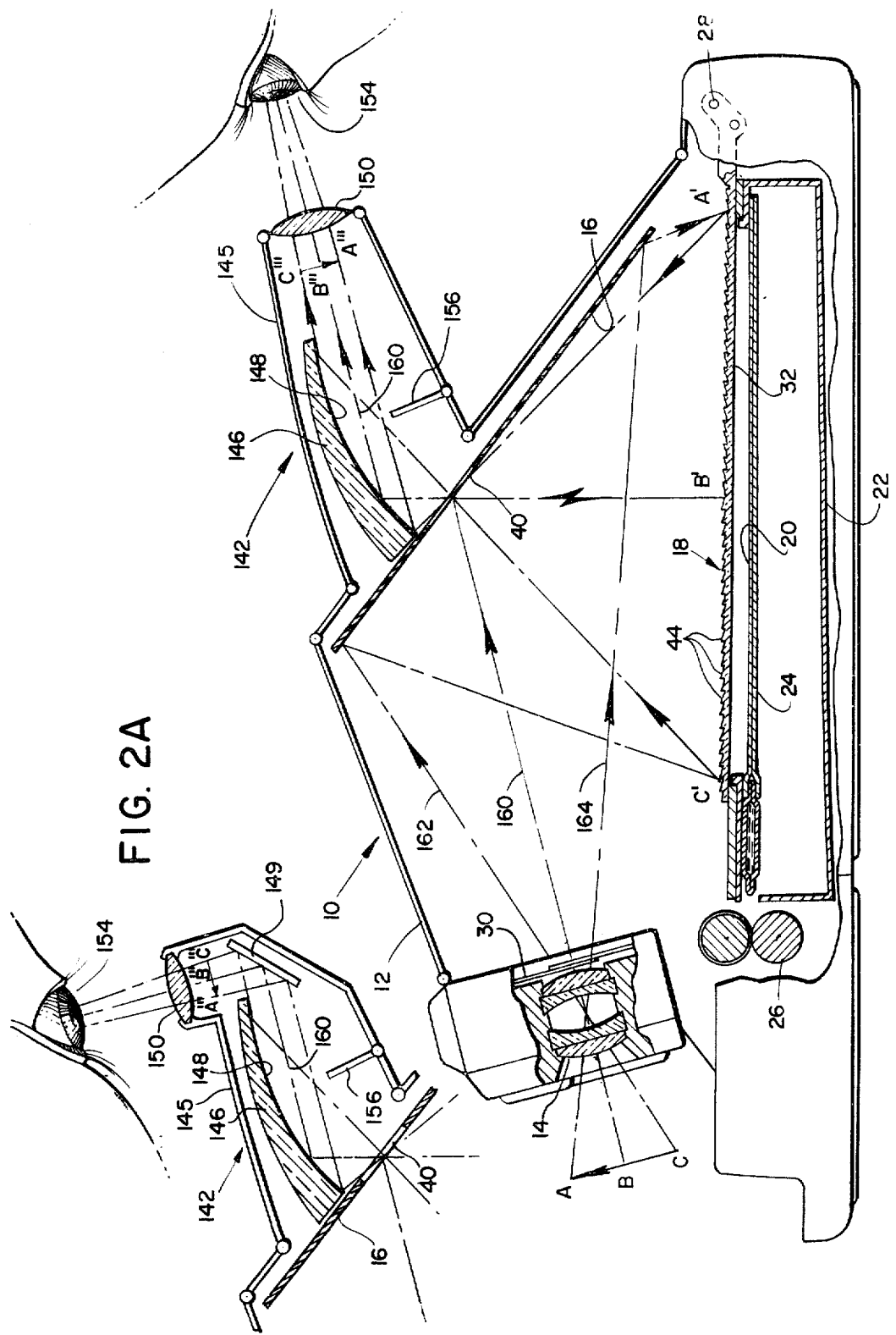

PARALLAX FREE VIEWER

BACKGROUND OF THE INVENTION

The present invention relates to viewing and focusing systems for compact foldable reflex cameras and for other cameras adapted to use Polaroid SX-70 Land Film. U.S. Pat. applications Ser. Nos. 264,933, now Pat. No. 3,783,764 filed June 21, 1972 and Ser. No. 294,252, now Pat. No. 3,800,309 filed Oct. 2, 1972 show such cameras. Such reflex cameras typically include a plane mirror to reflect the real image formed by the objective lens toward a film plane and a focusing screen proximate the film plane. The real image falls on the focusing screen while the camera is in its focusing /viewing mode of operation. Displacing the focusing screen to achieve the taking mode of operation, allows the real image to fall on a film unit situate at the film plane.

OBJECTS AND SUMMARY OF THE INVENTION

An object of the present invention is a reflex camera arrangement wherein the optic axis of the viewfinder coincides with the optic axis of a focusing screen and passes through a window in the camera's stationary reflex mirror.

Another object of the present invention is an optical imaging arrangement free of the perspective distortion and the aberrations stemming from viewing a focusing screen obliquely.

Other objects of the invention will in part appear hereinafter and will in part be obvious from the following description.

These objects of the invention are accomplished by an optical arrangement including a window in the camera's stationary reflex mirror through which the camera's focusing screen can be viewed. The window is opposite the geometric center of the focusing screen and the center of an echelon mirror on the surface of the focusing screen. The centers coincide. A concave mirror, opposite the window receives light from the focusing screen situated beneath the window and forms an aerial image of the focusing screen and any scene formed on it by the camera's objective lens.

An eye lens between the concave mirror and an eye station forms a magnified virtual image that shows the focus and composition of the scene. The camera's construction assures that the scene observed through the viewer will correlate with the photograph taken when the focusing screen uncovers a film unit in the focal plane.

One embodiment of the invention employs and ellipsoidal reflecting surface on the concave mirror. It has two foci, one at the window and the other disposed toward the eye station.

Another embodiment of the invention employs a parabolic reflecting surface on the concave mirror and a second plane mirror to reflect the aerial image toward the eye lens. This arrangement provides the user with an erect and unreverted image in the viewer.

DESCRIPTION OF THE DRAWINGS

For a fuller understanding of the nature and objects of the invention, reference should be had to the following detailed description taken in connection with the accompanying drawings, wherein:

FIG. 2 illustrates an embodiment of the invention using an ellipsoidal reflecting surface in the viewer; and FIG. 2a illustrates a modification of the embodiment using an ellipsoidal reflecting surface.

THE PREFERRED EMBODIMENT

Figure 1:
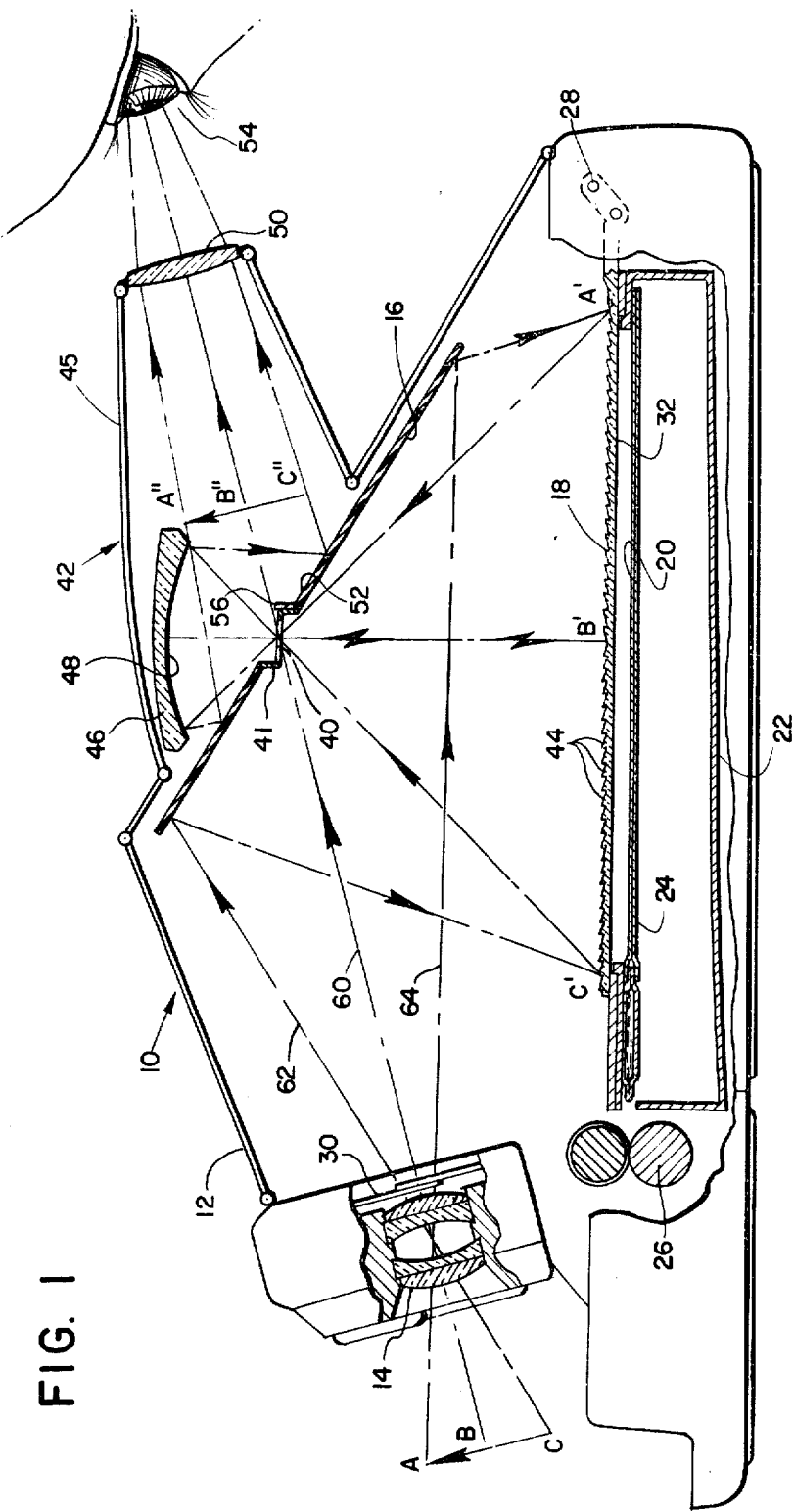
FIG. 1 illustrates an embodiment of the invention using a parabolic reflecting surface in the viewer.

FIG. 1 illustrates a reflex camera 10 in a foldable housing 12. It includes an objective lens 14 for forming a real image A'B'C' of a subject ABC and a stationary plane reflex mirror 16 for reflecting the real image A'B'C' toward a focusing screen 18. The focusing screen 18 covers, and is proximate to, a film plane 20. A cassette 22 can be placed inside the housing 12 below the film plane 20. The cassette 22 contains a number of film units such as Polaroid SX-70 Land Film, and a mechanism for urging the photosensitive surface of the uppermost film unit 24 into the film plane 20.

A mechanism (not illustrated) within the housing 12 ejects the uppermost film unit 24 into the bite of a pair of processing rolls 26 after an exposure is made on the uppermost film unit 24. The operation of the processing rolls 26 bursts a pod of chemicals assembled with the film unit 24 and spreads it across the photosensitive surface to develop the latent image stored therein by the exposure. The processing rolls 26 simultaneously eject the film unit 24 from the camera 10. Polaroid SX-70 Land Film such as described in U.S. Pat. No. 3,415,644 will develop normally in a bright environment.

The focusing screen 18 is pivotable about an axis 28 at the back of the camera housing 12. It rotates upward toward the plane mirror 16 to uncover the film plane 20. The rotation begins in response to actuating the shutter release (not shown) before the shutter 30 itself opens. A photo recording reflex mirror 32, attached to the underside of the focusing screen 18, comes to rest parallel to the stationary reflex mirror 16 at the end of the upward rotation. It reflects the real image A'B'C' formed by the objective lens 14 onto the photosensitive surface of the film unit 24 in the film plane 20.

The optical path length from the lens 14 to the film plane 20, via the recording reflex mirror 32, with the camera 10 in its photo recording mode (not illustrated) is designed to equal the optical path length from the lens 14 to the focusing screen 18, via the stationary reflex mirror 16, with the camera 10 in the viewing mode. Thus, accurate construction of the reflex camera 10 ensures that any real image sharply focused on the focusing screen 18 will focus sharply on the film plane 20.

After exposing the film unit 24 the shutter closes and the focusing screen 18 rotates down to its lowermost position proximate the film plane 20. Then the shutter 30 opens again to restore the image for viewing.

Viewing the real image A'B'C' on the focusing screen 18 is done through a window 40 in the stationary reflex mirror 16. The window is located along the axis through the geometric center of the focusing screen 18. This arrangement, with the perspective center on axis avoids an oblique view of the focusing screen 18 and, as a consequence, the optics of a viewer 42 for observing the real image A'B'C' can be simple and are easily corrected for aberrations otherwise present.

An echelon mirror is provided on the focusing screen 18 to maximize the light transfer into the viewer 42 and provide the brightest image possible. It comprises a plurality of concentric echelon rulings 44 with an aluminum or other reflective coating. They are also concentric about the geometric center of the focusing screen 18. An optimum configuration for the echelon rulings 44 is one that forms an image of the objective lens 14's exit pupil concentric with and proximate to the window 40. This helps to maximize the light entering the viewer 42 from the focusing screen 18 through the window 40.

The viewer 42 is enclosed in a foldable sub-housing 45 that closes when the camera housing 12 does. Its several optical parts are mounted so they fold up with the sub-housing 45. The folding features are not shown, but are suggested by the drawings. The principal optical parts include a concave mirror 46 with a reflecting surface 48, an eye lens 50 and a plane mirror 52.

The concave mirror 46 is located outside the window 40 so as to receive the light emanating, by reflection, from the focusing screen 18. Its reflecting surface 48 is co-axial with the concentric circular echelon rulings 44 and forms and aerial image A"B"C" of the focusing screen 18 and of the real image A'B'C' formed thereon.

The reflecting surface 48 can be parabolic or nearly parabolic or some other higher order rotationally symmetric shape. Shapes of higher mathematical order might be particularly useful because of the relatively large angular field required of the concave mirror 46. The higher order terms describing such a surface allow control of the aberrations otherwise associated with large field angles. The use of the term parabolic herein is meant to include all of the foregoing.

The eye lens 50 magnifies the aerial image A"B"C" to form a virtual image viewable from an eye station 54. The eye station 54 coincides with the exit pupil of the viewer 42 which is the image of the window 40 formed by the concave mirror 46 and the eye lens 50. In FIG. 1, the eye of a user is illustrated there.

Between the concave mirror 46 and the eye lens 50 is a second plane mirror 52 surrounding the window 40. It erects the image A"B"C", as seen through the eye lens 50, and turns the optical path of the viewer 42 parallel to the optic axis of the objective lens 14. The reflecting surface of the second plane mirror 52 is substantially parallel to the reflecting surface of the first plane mirror 16.

Inside the viewer 42, proximate the window 40 a small light baffle 56 prevents light entering through the objective lens 14 from reaching the eye station 54 directly, if desired.

The line 60 denotes the optic axis of the reflex camera 10 and the viewer 42. It passes, coaxially through the objective lens 14 to the focusing screen 18 via the first plane mirror 16 and then to the center of the echelon grooves 44, and from there, through the window 40 onto the parabolic reflecting surface 48. It then passes to the eye station 54 via the second plane mirror 52. It is not necessary that the axis of the camera 10 and the viewer 42 be parallel, but parallelism is a convenience for most users.

A light ray connot follow the path of line 60 exactly, because of the insert 40 in the stationary mirror 16. However, paraxial light rays will approximately follow that path. The extreme light rays 62 and 64 further clarify the general path of light through the combined optical systems of the camera 10 and the viewer 42.

The window 40 serves as the entrance aperture for the viewer 42. It is tilted with respect to the optic axis through it. Under certain circumstances, recognized by those skilled in the art, an aperture with its plane normal to the optic axis through it is desirable. This may readily be achieved by using an aperture insert 41 constructed so the opening through it, rather than the perimeter of the window 40 functions as the entrance aperture for the viewer 42.

In lieu of a window 40 perforated through the first and second plane mirrors 16 and 52 a clear transparent area in their substrates will suffice. Also, a semitransparent area (a beam splitter) can service as the window 40. Those skilled in the art will appreciate the relative merits of these alternatives for their effect on the brightness and content of the virtual image seen from the eye station 54.

Reference should be had to FIG. 2 for an understanding of an alternative arrangement of optics for the viewer 142. The operation of the reflex camera 12 and the arrangement of its parts is as described for FIG. 1, including the window 40 opposite the center of the focusing screen 18 and the latter's circular echelons 44.

In the alternative arrangement of FIG. 2, a concave mirror 146 situate over the window 40 has an ellipsoidal reflecting surface 148 with two foci. One focus of the ellipsoidal reflecting surface 148 is proximate the window 40 and the second focus is disposed toward the eye station 154. The concave mirror 146 form an aerial image A"B"C". An eye lens 150 magnifies the aerial image to form a virtual image the user can see from the eye station 154. The aerial image A"B"C" and the virtural image of it appear inverted, but not reverted, because this optical arrangement does not include a second reflection (such as the plane mirror 52 of FIG. 1) to erect it.

The concave mirror 146 and the eye lens 150 may both be supported in a sub-housing 145 that can close when the camera housing 12 closes.

The eye station 154 coincides with the exit pupil of the viewer 142 which is the image of the window 40 formed by the concave mirror 146 and the eye lens 150.

Light emanating from the image A'B'B' on the focusing screen 18 reflects from the concave mirror 146 directly toward the eye station 154 in a direction parallel with the objective lens's optic axis. Light ray 160 coincides with that optic axis and that of the camera 10 and the viewer 142. This arrangement avoids a second reflection from a mirror with a relatively large central opening in itself, such as the second plane mirror 52 of FIG. 1. It avoids light losses due to a hole in the second mirror and thereby contributes to the brightness of the image seen from the eye station 154. A baffle 156 inside the foldable sub-housing 145 prevents the direct passage of light from the objective lens 14 through the viewer 142.

Light rays 162 and 164, along with line 160, provide a clear idea of the course light takes through the combined optical systems of the reflex camera 10 and the viewer 142. The line 160 drawn from the lens 14 to the focusing screen 18, via the stationary mirror 16, and from there through the window to the concave mirror 146 and thence beyond the eye lens 150 is for illustrative purposes. No light ray can actually follow it. However, paraxial light rays will closely approximate its course.

Those skilled in the art will now recognize that an erecting element can be added to the optics of the viewer 142 to erect the virtual image seen through the eye lens 150. A plane mirror 149 between the concave mirror 146 and the eye lens 150, as shown in FIG. 2a, will suffice, but other means will suffice too.

Improvement of the viewed virtual image's quality can be obtained by using aspheric shapes on the optical surfaces in the viewers 42 or 142 to compensate for the unusually large field angles of these viewers.

It can now be readily understood that many variations and modifications of the present invention are possible in light of the aforementioned teachings, and it will be apparent to those skilled in the art that various changes in form and arrangement of components may be made to suit specific requirements without departing from the spirit and scope of the invention. It is, therefore, to be understood that, within the scope of the appended claims, the instant invention may be practiced in a manner otherwise than specifically described herein.

What is claimed is:

1. A reflex camera comprising:
   an objective lens for forming a real image of a subject;
   a film plane;
   a reflective focusing screen;
   means for positioning said reflective forcusing screen proximate said film plane;
   a first plane mirror for reflecting said real image onto said reflective focusing screen;
   a window, opposite the geometric center of said reflective focusing screen, in said first plane mirror for transmitting light reflected from said reflective focusing screen;
   said reflective focusing screen having a plurality of reflective circular echelons situate on said reflective focusing screen and concentric with said geometric center, configured for forming an image of said objective lens's exit pupil at said window, said echelons having an optic axis normal to said reflective focusing screen and passing through its geometric center; and
   means, including a concave mirror, situate on the side of said first plane mirror opposite said reflective focusing screen to receive said light transmitted through said window from said reflective focusing screen, for forming an aerial image of the real image focused on said reflective focusing screen.

2. The reflex camera described in claim 1 further comprising:
   an eye lens for magnifying said aerial image.

3. The reflex camera described in claim 2 further comprising:
   a second plane mirror parallel to said first plane mirror for reflecting said aerial image in a direction parallel to the optic axis of said objective lens toward on eye station; and
   a parabolic reflecting surface, on said concave mirror, coaxial with said optic axis of said plurality of concentric echelons.

4. The reflex camera described in claim 2 wherein said concave mirror has an ellipsoidal reflecting surface with two foci, one proximate said window and the other disposed toward an eye station.

5. The reflex camera described in claim 4 further comprising:
   means for erecting and unreverting the virtual image visible from said eye station.

6. A reflex camera comprising:
   an objective lens;
   an eye lens; and
   means defining an optical path between said objective lens and said eye lens, said optical path defining means including a first plane mirror disposed to reflect a primary real image of a subject formed by said objective lens onto a reflective focusing screen positioned at a focal plane of said objective lens, a window through said first mirror situate opposite the geometric center of said reflective focusing screen, a concave mirror on the opposite side of said first plane mirror from said focusing screen for forming an aerial image of the real image focused on said reflective focusing screen using light relected from said reflective focusing screen and passing through said window, said eye lens arranged to form a magnified virtual image of said aerial image.

7. A photographic camera having means defining an optical path through said camera from an objective lens to an eye station, including a displaceable focusing screen covering the film plane of said camera, mirror means for reflecting a real image of a subject formed by said objective lens toward said focusing screen, said camera further including:
   viewing means for inspecting said real image at said focusing screen, said viewing means comprising means forming a window in said mirror means situate opposite the geometric center of said focusing screen, and a concave mirror situate on the side of said mirror means opposite from said focusing screen; said optical path coursing from said objective lens to said focusing screen via reflecting from said mirror means, and then coursing from said focusing screen through said window to said eye station via reflection from said concave mirror.

8. The photographic camera described in claim 7 wherein said viewing means further includes an eye lens for magnifying said image for a user inspecting it from said eye station.

9. The photographic camera described in claim 8 wherein said concave mirror has an ellipsoidal reflecting surface having two foci, one focus proximate said window and the other focus disposed toward said eye station.

10. The photographic camera described in claim 8 wherein said concave mirror has a parabolic reflecting surface and further comprising:
    a plane mirror, said plane mirror and said parabolic reflecting surface being oriented so that said optical path courses from said window to said eye station via a reflection from said parabolic reflecting surface and then a reflection from said plane mirror.

11. The photographic camera described in claim 7 wherein said focusing screen has a plurality of echelon rulings concentric with the geometric center of said focusing screen, said plurality of echelon rulings configured to form an image of the exit pupil of said objective lens at said window.

12. A reflex camera comprising:
    an objective lens having an optic axis for forming a real image of a subject;
    a film plane;
    a first plane mirror for reflecting said real image toward said film plane, said first plane mirror having a window therethrough at the intersection of said optic axis with said first plane mirror;

a focusing screen, positionable proximate said film plane and movable therefrom, having a plurality of reflective circular echelons thereon for imaging the exit pupil of said objective lens at said window;

a parabolic mirror on the opposite side of said window from said focusing screen for forming an aenal image of the real image formed on said focusing screen; and a second plane mirror surrounding said window for reflecting said aerial image parallel to the direction of said optic axis.

13. The reflex camera described in claim 12 further comprising:

an eye lens for forming a virtual image of said subject by magnifying said aerial image, wherein the qualities of said virtual image indicate the qualities that a picture taken with the same adjustments of said reflex camera will have.

14. A reflex camera comprising:

an objective lens for forming a real image of a subject;

means for defining a film plane;

a reflective focusing screen positionable proximate said film plane;

a first plane mirror for reflecting said real image onto said reflective focusing screen, said first plane mirror having a window therein opposite the geometric center of said reflective focusing screen, said reflective focusing screen having a plurality of concentric echelon rulings for forming an image of the exit pupil of said objective lens concentric with and proximate to said window;

a parabolic mirror for receiving light reflected by said focusing screen through said window and for forming an aerial image of said real image formed on said focusing screen by said objective lens; and a second plane mirror parallel to said first plane mirror for reflecting said aerial image toward an eye station.

15. The reflex camera described in claim 14 further comprising:

an eye lens for forming a virtual image of said subject by magnifying said aerial image.

16. A reflex camera comprising:

an objective lens for forming a real image of a subject;

a film plane;

a reflective focusing screen positionable proximate said film plane;

a plane mirror for reflecting said real image onto said reflective focusing screen, said plane mirror having a window therein opposite the geometric center of said reflective focusing screen, said reflective focusing screen having a plurality of echelon rulings concentric with said geometric center for forming an image of said objective lens's exit pupil at said window; and an ellipsoidal mirror for receiving light reflected by said focusing screen through said window and for forming an aerial image of said real image formed on said focusing by said objective lens and said plane mirror.

17. The reflex camera described in claim 16 further comprising:

an eye lens for forming a virtual image of said subject by magnifying said aerial image.

* * * * *